(12) United States Patent
Ardisana, II et al.

(10) Patent No.: US 11,575,872 B2
(45) Date of Patent: *Feb. 7, 2023

(54) FLEXIBLE EYEWEAR DEVICE WITH DUAL CAMERAS FOR GENERATING STEREOSCOPIC IMAGES

(71) Applicant: Snap Inc., Santa Monica, CA (US)

(72) Inventors: John Bernard Ardisana, II, Torrance, CA (US); David Ben Ezra, Los Angeles, CA (US); Nir Daube, Pacific Palisades, CA (US); Mathias Hintermann, Los Angeles, CA (US); Sagi Katz, Yokneam Ilit (IL); Nati Kligler, Zippori (IL); Michael Christian Ryner, Santa Monica, CA (US); Ashutosh Y. Shukla, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,001

(22) Filed: Nov. 8, 2021

(65) Prior Publication Data

US 2022/0060675 A1 Feb. 24, 2022

Related U.S. Application Data

(63) Continuation of application No. 16/688,046, filed on Nov. 19, 2019, now Pat. No. 11,212,509.

(Continued)

(51) Int. Cl.
*H04N 13/239* (2018.01)
*H04N 5/225* (2006.01)
*H04N 13/246* (2018.01)

(52) U.S. Cl.
CPC ......... *H04N 13/239* (2018.05); *H04N 5/2253* (2013.01); *H04N 13/246* (2018.05)

(58) Field of Classification Search
CPC .. H04N 13/239; H04N 13/246; H04N 5/2253; G02B 2027/0178; G02B 2027/0136; G02B 27/017
See application file for complete search history.

(56) References Cited

U.S. PATENT DOCUMENTS

| 6,091,546 A | 7/2000 | Spitzer |
| 7,784,938 B2 | 8/2010 | Richards et al. |
| (Continued) | | |

FOREIGN PATENT DOCUMENTS

CN 105319718 A 2/2016

OTHER PUBLICATIONS

U.S. Appl. No. 16/706,162, filed Dec. 6, 2019, Dmitry Ryuma.

(Continued)

*Primary Examiner* — Brian P Yenke
(74) *Attorney, Agent, or Firm* — Culhane Meadows PLLC; Stephen J. Weed

(57) ABSTRACT

Three-dimensional image calibration and presentation for eyewear including a pair of image capture devices is described. Calibration and presentation includes obtaining a calibration offset to accommodate flexure in the support structure for the eyewear, adjusting a three-dimensional rendering offset by the obtained calibration offset, and presenting the stereoscopic images using the three-dimension rendering offset.

20 Claims, 4 Drawing Sheets

Related U.S. Application Data

(60) Provisional application No. 62/782,885, filed on Dec. 20, 2018.

(56) References Cited

U.S. PATENT DOCUMENTS

| | | | |
|---|---|---|---|
| 8,496,173 B2 | 7/2013 | Anselment et al. |
| 8,988,509 B1 | 3/2015 | Macmillan et al. |
| 9,239,460 B2 | 1/2016 | Sylvan et al. |
| 9,609,194 B2 | 3/2017 | Egger et al. |
| 9,609,305 B1 | 3/2017 | Ramaswamy |
| 9,628,778 B2 | 4/2017 | Hsueh et al. |
| 9,635,222 B2 | 4/2017 | Blum |
| 9,759,918 B2 | 9/2017 | Ebstyne et al. |
| 9,792,667 B2 | 10/2017 | Sun et al. |
| 9,965,030 B2 | 5/2018 | Jeong |
| 10,037,084 B2 | 7/2018 | Joo |
| 10,055,816 B2 | 8/2018 | Sun et al. |
| 10,104,364 B2 | 10/2018 | Goma et al. |
| 10,122,998 B2 | 11/2018 | Baarsen et al. |
| 10,152,119 B2 | 12/2018 | Tseng et al. |
| 10,168,772 B2 | 1/2019 | Kim et al. |
| 10,178,378 B2 | 1/2019 | Travis |
| 10,180,576 B2 | 1/2019 | Totani et al. |
| 10,187,628 B2 | 1/2019 | Barron et al. |
| 10,203,752 B2 | 2/2019 | Fateh |
| 10,215,989 B2 | 2/2019 | Harrison et al. |
| 10,271,042 B2 | 4/2019 | Rougeaux |
| 10,277,887 B2 | 4/2019 | Aoki et al. |
| 10,303,250 B2 | 5/2019 | Jeong |
| 10,345,903 B2 | 7/2019 | Robbins et al. |
| 10,368,059 B2 | 7/2019 | Fateh et al. |
| 10,378,882 B2 | 8/2019 | Yeoh et al. |
| 10,410,367 B2 | 9/2019 | Ezra et al. |
| 10,412,368 B2 | 9/2019 | Osterwood et al. |
| 10,412,382 B2 | 9/2019 | Cole et al. |
| 10,453,219 B2 | 10/2019 | Myokan |
| 10,482,627 B2 | 11/2019 | Kim et al. |
| 10,503,247 B2 | 12/2019 | Samples et al. |
| 10,504,243 B2 | 12/2019 | Linde et al. |
| 10,506,219 B2 | 12/2019 | Hwang et al. |
| 10,511,832 B1 | 12/2019 | Shen et al. |
| 10,587,868 B2 | 3/2020 | Yun et al. |
| 10,630,965 B2 | 4/2020 | Held et al. |
| 10,650,602 B2 | 5/2020 | You et al. |
| 10,659,683 B2 | 5/2020 | Campbell |
| 10,715,788 B2 | 7/2020 | Sheridan |
| 10,728,531 B2 | 7/2020 | Kashibuchi |
| 10,757,342 B1 | 8/2020 | Ding et al. |
| 10,764,556 B2 | 9/2020 | Katz |
| 10,798,365 B2 | 10/2020 | Macmillan et al. |
| 10,816,807 B2* | 10/2020 | Polcak | G02B 27/0172 |
| 10,873,734 B2 | 12/2020 | Katz |
| 10,887,573 B1 | 1/2021 | Kenrick |
| 10,896,494 B1 | 1/2021 | Katz et al. |
| 10,965,931 B1 | 3/2021 | Ryuma et al. |
| 10,983,593 B2 | 4/2021 | Jeong |
| 11,039,113 B2* | 6/2021 | Katz | H04N 13/344 |
| 11,089,289 B2 | 8/2021 | Ohishi et al. |
| 11,112,609 B1* | 9/2021 | Pomes | G02B 27/0172 |
| 11,113,889 B1* | 9/2021 | Castaneda | G06F 3/011 |
| 11,158,088 B2 | 10/2021 | Zhang et al. |
| 11,212,509 B2 | 12/2021 | Ardisana et al. |
| 11,259,008 B2* | 2/2022 | Ryuma | H04N 13/296 |
| 11,269,402 B1* | 3/2022 | Canberk | G09G 5/37 |
| 11,307,412 B1* | 4/2022 | Meisenholder | G02B 27/017 |
| 11,314,088 B2* | 4/2022 | Yun | H04N 13/156 |
| 11,323,680 B2 | 5/2022 | Kennedy et al. |
| 2002/0075201 A1 | 6/2002 | Sauer et al. |
| 2002/0082498 A1 | 6/2002 | Wendt et al. |
| 2002/0113756 A1 | 8/2002 | Tuceryan et al. |
| 2005/0207486 A1 | 9/2005 | Lee et al. |
| 2010/0007582 A1 | 1/2010 | Zalewski |
| 2010/0110368 A1 | 5/2010 | Chaum |
| 2012/0113235 A1 | 5/2012 | Shintani |
| 2012/0167124 A1 | 6/2012 | Abdeljaoued |
| 2012/0229613 A1 | 9/2012 | Yoshida et al. |
| 2013/0015244 A1 | 1/2013 | Anselment et al. |
| 2013/0038510 A1 | 2/2013 | Brin et al. |
| 2013/0120224 A1 | 5/2013 | Cajigas et al. |
| 2013/0187943 A1 | 7/2013 | Bohn et al. |
| 2015/0055085 A1 | 2/2015 | Fonte et al. |
| 2015/0185476 A1 | 7/2015 | Lee |
| 2015/0215547 A1 | 7/2015 | Muller |
| 2015/0323792 A1* | 11/2015 | Kinoshita | G02B 27/017 345/8 |
| 2015/0338498 A1 | 11/2015 | Weber et al. |
| 2016/0034032 A1 | 2/2016 | Jeong |
| 2016/0034042 A1 | 2/2016 | Joo |
| 2016/0037032 A1 | 2/2016 | Iwama |
| 2016/0091725 A1 | 3/2016 | Kim et al. |
| 2016/0117864 A1 | 4/2016 | Cajigas et al. |
| 2016/0119523 A1 | 4/2016 | Egger et al. |
| 2016/0165218 A1 | 6/2016 | Seo et al. |
| 2016/0225191 A1 | 8/2016 | Mullins |
| 2016/0284129 A1 | 9/2016 | Nishizawa et al. |
| 2017/0034499 A1 | 2/2017 | Doron et al. |
| 2017/0363885 A1 | 12/2017 | Blum et al. |
| 2018/0017815 A1 | 1/2018 | Chumbley et al. |
| 2018/0031842 A1 | 2/2018 | Tsai et al. |
| 2018/0031847 A1 | 2/2018 | Tatsuta et al. |
| 2018/0213201 A1 | 7/2018 | Zhang et al. |
| 2018/0224934 A1 | 8/2018 | Jeong |
| 2018/0288317 A1 | 10/2018 | Nopper et al. |
| 2018/0350107 A1 | 12/2018 | Myokan |
| 2018/0365859 A1 | 12/2018 | Oba et al. |
| 2019/0025591 A1 | 1/2019 | Wang et al. |
| 2019/0076013 A1 | 3/2019 | Aferzon et al. |
| 2019/0082166 A1 | 3/2019 | Song et al. |
| 2019/0108652 A1 | 4/2019 | Linde et al. |
| 2019/0129181 A1* | 5/2019 | Polcak | G06T 19/006 |
| 2019/0129184 A1 | 5/2019 | Hu et al. |
| 2019/0158716 A1 | 5/2019 | Kerr et al. |
| 2019/0182415 A1 | 6/2019 | Sivan |
| 2019/0197982 A1 | 6/2019 | Chi et al. |
| 2019/0243157 A1 | 8/2019 | Sheldon et al. |
| 2019/0258077 A1 | 8/2019 | Sheldon et al. |
| 2019/0281199 A1 | 9/2019 | Müller et al. |
| 2020/0053342 A1 | 2/2020 | Macmillan et al. |
| 2020/0074684 A1 | 3/2020 | Lin et al. |
| 2020/0077073 A1 | 3/2020 | Nash et al. |
| 2020/0107005 A1 | 4/2020 | Katz |
| 2020/0107013 A1 | 4/2020 | Hudman et al. |
| 2020/0133031 A1 | 4/2020 | Muramatsu et al. |
| 2020/0175238 A1 | 6/2020 | Müller et al. |
| 2020/0175705 A1 | 6/2020 | Ezra et al. |
| 2020/0204787 A1 | 6/2020 | Ardisana et al. |
| 2020/0213572 A1 | 7/2020 | Katz et al. |
| 2020/0233213 A1 | 7/2020 | Porter et al. |
| 2020/0302665 A1 | 9/2020 | Onozawa et al. |
| 2020/0413030 A1 | 12/2020 | Zak et al. |
| 2021/0067764 A1 | 3/2021 | Shau et al. |
| 2021/0096388 A1 | 4/2021 | Hanover et al. |
| 2021/0099691 A1 | 4/2021 | Danziger |
| 2021/0112230 A1 | 4/2021 | Katz |
| 2021/0203909 A1 | 7/2021 | Ryuma et al. |
| 2021/0217147 A1 | 7/2021 | Edwin et al. |
| 2021/0271081 A1 | 9/2021 | Yun et al. |
| 2021/0297584 A1* | 9/2021 | Moubedi | H04N 5/23216 |
| 2021/0337181 A1* | 10/2021 | Shin | G02C 5/12 |
| 2021/0374918 A1 | 12/2021 | Margolis et al. |
| 2021/0375301 A1* | 12/2021 | Geddes | G10L 17/18 |
| 2021/0390882 A1* | 12/2021 | Iyengar | G06V 10/25 |
| 2021/0409628 A1* | 12/2021 | Kalkgruber | G01S 5/16 |
| 2021/0409678 A1 | 12/2021 | Birklbauer et al. |
| 2022/0060675 A1 | 2/2022 | Ardisana et al. |
| 2022/0082827 A1* | 3/2022 | Micusik | G01S 11/12 |
| 2022/0099972 A1 | 3/2022 | Birklbauer |
| 2022/0099973 A1* | 3/2022 | Goodrich | G02B 27/0149 |
| 2022/0103748 A1* | 3/2022 | Canberk | H04N 5/23293 |
| 2022/0103757 A1* | 3/2022 | Ding | H04N 5/23245 |
| 2022/0103802 A1* | 3/2022 | Heger | H04N 13/344 |
| 2022/0174188 A1 | 6/2022 | Price et al. |
| 2022/0197033 A1 | 6/2022 | Liang et al. |
| 2022/0206316 A1* | 6/2022 | Hatfield | G06F 1/163 |

(56) References Cited

U.S. PATENT DOCUMENTS

OTHER PUBLICATIONS

U.S. Appl. No. 17/553,287, filed Dec. 16, 2021 to Ryuma et al.
International Search Report and Written Opinion for International Application No. PCT/US2019/062136, dated Feb. 10, 2020 (dated Feb. 10, 2020)—15 pages.
1st Chinese Office Action for Chinese Application No. 201980083770.8, dated Sep. 13, 2022 (Sep. 13, 2022)—8 pages (English translation—4 pages).

* cited by examiner

FLEXIBLE EYEWEAR DEVICE WITH DUAL CAMERAS FOR GENERATING STEREOSCOPIC IMAGES

CROSS-REFERENCE TO RELATED APPLICATIONS

This application is a Continuation of U.S. application Ser. No. 16/688,046 filed on Nov. 19, 2019, which claims priority to U.S. Provisional Application Ser. No. 62/782,885 filed on Dec. 20, 2018, the contents of both of which are incorporated fully herein by reference.

TECHNICAL FIELD

The present subject matter relates to image capture eyewear, e.g., smart glasses, and, more particularly, to image capture eyewear with dual cameras for generating stereoscopic images.

BACKGROUND

Stereoscopic images of a scene are useful to create a three-dimensional effect. Typically, a first camera captures a first image of the scene, and a second camera captures a second image of the same scene. The first and second cameras have a fixed relationship to one another. A three-dimensional display system presents the captured first image to an eye of an observer and the captured second image to the other eye of the observer to create the desired three-dimensional effect. The relationship between the first and second cameras is important in order to provide a realistic three-dimensional effect. If the relationship between the first and second cameras deviates from the fixed relationship, e.g., due to bending of the support structure on which the cameras are mounted, the three-dimensional experience is adversely affected.

BRIEF DESCRIPTION OF THE DRAWINGS

The drawings depict implementations, by way of example only, not by way of limitations. In the figures, like reference numerals refer to the same or similar elements. When a plurality of similar elements is present, a single reference numeral may be assigned to the plurality of similar elements with a small letter designation referring to specific elements. When referring to the elements collectively or to a non-specific one or more of the elements, the small letter designation may be dropped.

DETAILED DESCRIPTION

In the following detailed description, numerous specific details are set forth by way of examples in order to provide a thorough understanding of the relevant teachings. However, it should be apparent to those skilled in the art that such details are not necessary to practice the present teachings. In other instances, a relatively high-level description, without detail, of well-known methods, procedures, components, and circuitry avoids unnecessarily obscuring aspects of the present teachings.

The term "coupled" as used herein refers to any logical, optical, physical, or electrical connection, link or the like by which signals or light produced or supplied by one system element are imparted to another coupled element. Unless described otherwise, coupled elements or devices are not necessarily physically connected to one another and may be separated by airspace, intermediate components, elements, or communication media that may modify, manipulate, or carry the light or signals.

The orientations of the image capture eyewear, associated components, and any devices incorporating an LED such as shown in any of the drawings, are by way of example only, for illustration and discussion purposes. In operation, orientation of the image capture eyewear may be in other directions suitable to the particular application of the image capture eyewear, for example up, down, sideways, or any other orientation. Also, any directional term, such as front, rear, inwards, outwards, towards, left, right, lateral, longitudinal, up, down, upper, lower, top, bottom and side, is exemplary, and not limiting, as to direction or orientation.

Example image capture eyewear has an optical element, electronic components, a support structure configured to support the optical element and the electronic components including dual cameras, and a display system coupled to the electronic components and supported by the support structure. The dual cameras capture stereoscopic images for use in rendering three dimensional images and/or creating a three-dimensional effect.

Figure 1A:
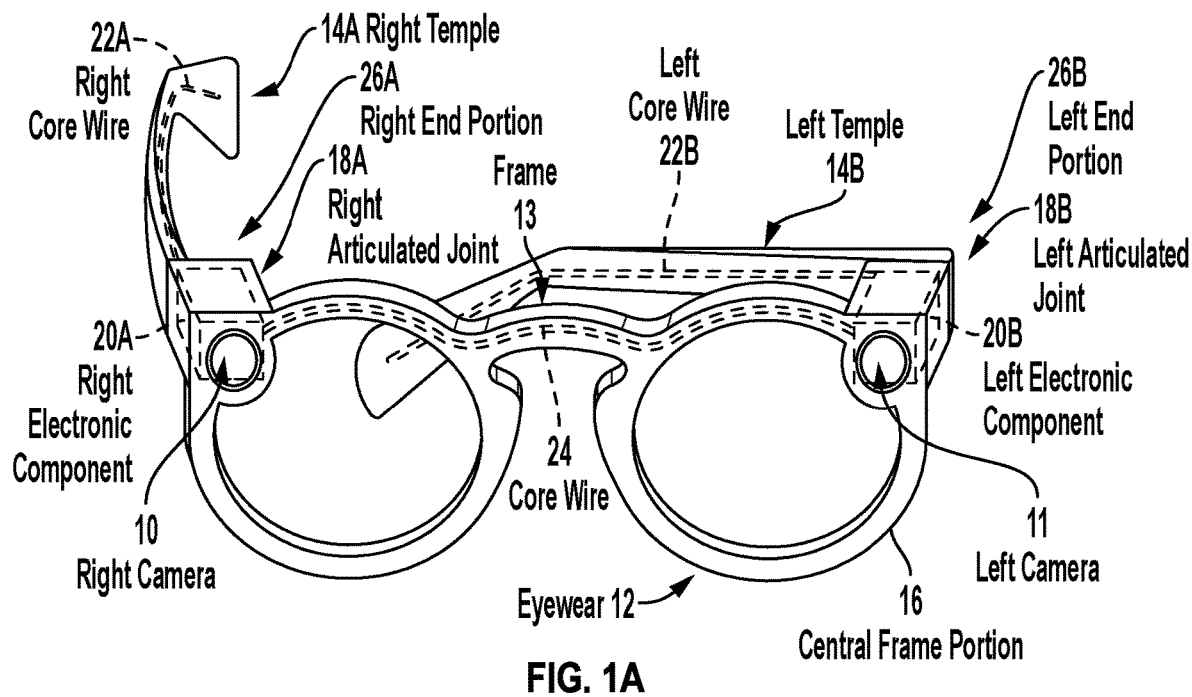
FIG. 1A is a perspective view of an image capture eyewear example including dual cameras and a support structure supporting the dual cameras and other electronic components.

FIG. 1A depicts a front perspective view of a first camera 10 and a second camera 11 on example image capture eyewear 12. The illustrated image capture eyewear 12 includes a support structure 13 that has temples 14A and 14B extending from a central frame portion 16. Image capture eyewear 12 additionally includes articulated joints 18A and 18B, electronic components 20A and 20B, and core wires 22A, 22B and 24. Although the illustrated image capture eyewear 12 are glasses, the image capture eyewear may take other forms such as a headset, head gear, helmet, or other device that may be worn by the user.

Support structure 13 supports the first and second cameras 10, 11. Support structure 13 also supports one or more optical elements within a field of view of a user when worn by the user. For example, central frame portion 16 supports the one or more optical elements. As used herein, the term "optical elements" refers to lenses, transparent pieces of glass or plastic, projectors, screens, displays and other devices for presenting visual images or through which a user perceives visual images. In an example, respective temples 14A and 14B connect to central frame portion 16 at respective articulated joints 18A and 18B. The illustrated temples 14A and 14B are elongate members having core wires 22A and 22B extending longitudinally therein.

Temple 14A is illustrated in a wearable condition and temple 14B is illustrated in a collapsed condition in FIG. 1A. As shown in FIG. 1A, articulated joint 18A connects temple 14A to a right end portion 26A of central frame portion 16. Similarly, articulated joint 18B connects temple 14B to a left end portion 26B of central frame portion 16. The right end portion 26A of central frame portion 16 includes a housing that carries electronic components 20A therein. The left end portion 26B also includes a housing that carries electronic components 20B therein. The housings may be integrally formed with the central frame, integrally formed with the respective temples 14A, 14B, or formed as separate components.

A plastics material or other material embeds core wire 22A, which extends longitudinally from adjacent articulated joint 18A toward a second longitudinal end of temple 14A. Similarly, the plastics material or other material also embeds core wire 22B, which extends longitudinally from adjacent articulated joint 18B toward a second longitudinal end of temple 14B. The plastics material or other material additionally embeds core wire 24, which extends from the right end portion 26A (terminating adjacent electronic components 20A) to left end portion 26B (terminating adjacent electronic components 20B).

Electronic components 20A and 20B are carried by support structure 13 (e.g., by either or both of temple(s) 14A, 14B and/or central frame portion 16). Electronic components 20A and 20B include a power source, power and communication related circuitry, communication devices, display devices, a computer, a memory, modules, and/or the like (not shown). Electronic components 20A and 20B may also include or support dual cameras 10 and 11 for capturing images and/or videos from different perspectives. These images may be fused to generate a stereoscopic images/videos. Also included, but not shown in the figure, are indicator LEDs indicating the operational state of image capture eyewear and one or more microphones for capturing audio that coincides with the captured video.

In one example, temples 14A and 14B and central frame portion 16 are constructed of a plastics material, cellulosic plastic (e.g., cellulosic acetate), an eco-plastic material, a thermoplastic material, or the like, with core wires 22A, 22B and 24 embedded therein. Core wires 22A, 22B and 24 provide structural integrity to support structure 13 (i.e., temple(s) 14A, 14B and/or central frame portion 16). Additionally, core wires 22A, 22B and/or 24 act as a heat sink to transfer heat generated by electronic components 20A and 20B away therefrom so as to reduce the likelihood of localized heating adjacent electronic components 20A and 20B. As such, core wires 22A, 22B and/or 24 thermally couple to the heat source to provide a heat sink for the heat source. Core wires 22A, 22B and/or 24 may include relatively flexible conductive metal or metal alloy material such as one or more of an aluminum, an alloy of aluminum, alloys of nickel-silver, and a stainless steel, for example.

Figure 1B:
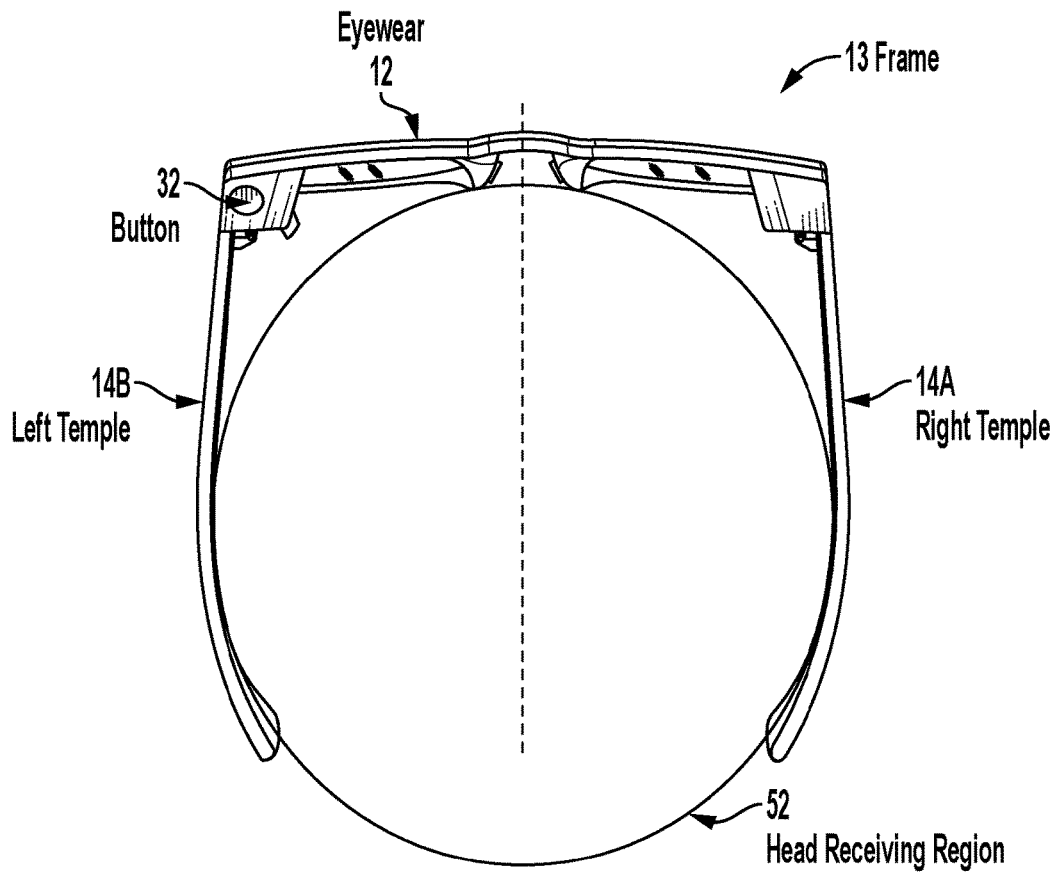
FIG. 1B is a top view of the image capture eyewear example of FIG. 1A illustrating a region defined by the image capture eyewear for receiving a head of a user wearing the image capture eyewear.

As illustrated in FIG. 1B, support structure 13 defines a region (e.g., region 52 defined by the frame 12 and temples 14A and 14B) for receiving a portion 52 (e.g., the main portion) of the head of the user/wearer. The defined region(s) are one or more regions containing at least a portion of the head of a user that are encompassed by, surrounded by, adjacent, and/or near the support structure when the user is wearing the image capture eyewear 12.

Figure 1C:
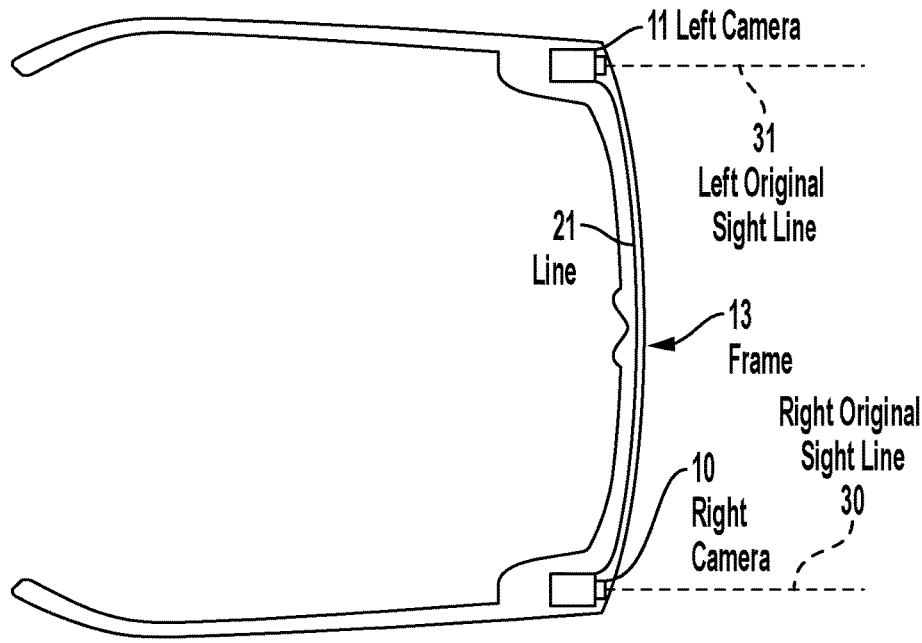
FIG. 1C is a top-side view of the image capture eyewear example of FIG. 1A showing the locations of the dual cameras and the flexibility of the eyewear.

As described above, image capture eyewear 12 has dual cameras 10, 11 for capturing stereoscopic images. A simplified overhead view of the dual cameras 10, 11 is shown in FIG. 1C, where frame 13 includes cameras 10, 11 integrated into respective, opposite sides (i.e., left and right sides) of frame 13. The first camera 10 has a first sight line 30 and the second camera 11 has a second sight line 31. In an example, absent flexing of the frame 13, the first and second sight lines 30, 31 are substantially parallel. Generally, stereoscopic imaging is a technique for generating what appears to be a three-dimensional (3D) image having depth from two or more offset two-dimensional (2D) images. Stereoscopic imaging is performed naturally by humans who capture offset images with their respective left and right eyes. These offset images are then combined by the brain to form what appears to be a 3D image (i.e., an image with depth).

Generation of three-dimensional images and/or creation of a three-dimensional effect generally requires the fusion of stereoscopic images. For example, a stereoscopic imaging algorithm may create a three-dimensional image by fusing the stereoscopic images using the known sight lines, separation of the sight lines, and/or fields of view of the cameras. A stereoscopic imaging algorithm may create a three-dimensional effect by presenting a first of the stereoscopic images to a first eye of an observer via a display and a second of the stereoscopic images to a second eye of the observer via the same or a different display using the known sight lines, separation of the sight lines, and/or fields of view of the cameras.

The stereoscopic imaging algorithm can extract depth information by comparing information about a scene from the stereoscopic images, e.g., by examining the relative positions of objects in the two images. In traditional stereo vision, two cameras, displaced horizontally from one another are used to obtain two differing views on a scene. By comparing these two images, the relative depth information can be obtained in the form of a disparity map, which encodes the difference in horizontal coordinates of corresponding image points. The values in this disparity map are inversely proportional to the scene depth at the corresponding pixel location.

For a human to experience a three-dimensional effect, a stereoscopic device may superimpose the stereoscopic images, with the image from the right camera 10 being shown to the observer's right eye and from the left camera 11 being shown to the left eye. The images may be pre-processed to increase picture quality. For example, the images may first be processed to remove distortion (e.g., due to having been acquired with a "fisheye" lens). For example, barrel distortion and tangential distortion may be removed to ensure the observed image matches the projection of an ideal pinhole camera. The image may additionally be projected back to a common plane to allow comparison of the image pairs, known as image rectification. An information measure which compares the two images is minimized. This gives the best estimate of the position of features in the two images and creates a disparity map. Optionally, the received disparity map is projected into a three-dimensional point cloud. By utilizing the cameras' projective parameters, the point cloud can be computed such that it provides measurements at a known scale.

The algorithm(s) for presenting the stereoscopic images to produce a three-dimensional effect is dependent on the relative sightlines/fields of views between the respective cameras. Without this information, the algorithm(s) may not be able to properly fuse/display the stereoscopic images to achieve the desired three-dimensional effect.

All eyewear has a stiffness that enables support of the eyewear components, while allowing for some flexibility for user comfort. This flexibility, however, complicates the capture of suitable stereoscopic images to produce a desired three-dimensional effect, which, as described above, require the cameras to have a known sight lines/fields of view with respect to one another.

Figure 1D:
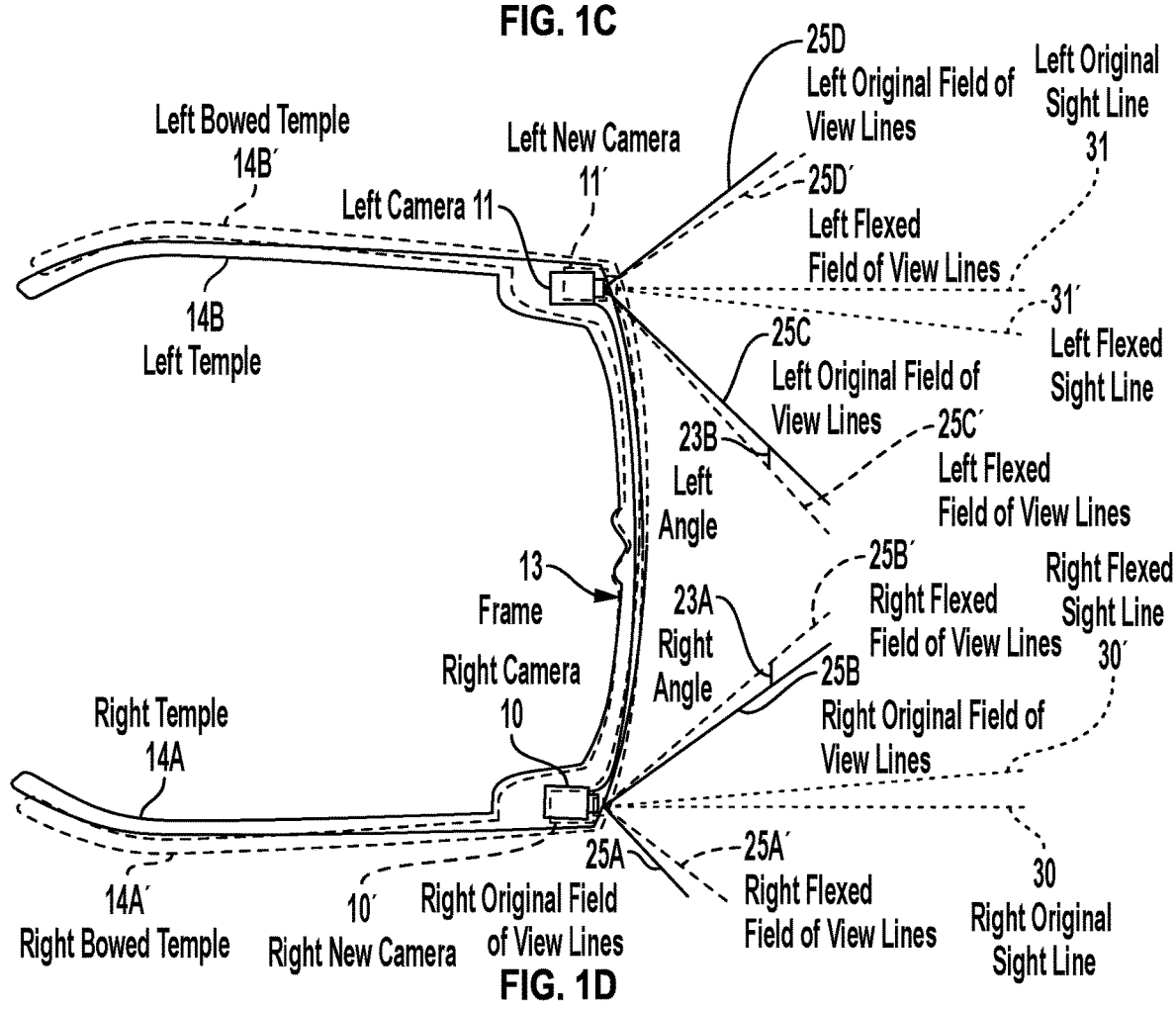
FIG. 1D is another top-side view of the image capture eyewear example of FIG. 1A showing the respective fields of view of the dual cameras at different flex positions.

For example, the stereoscopic imaging algorithm may be set based on the known fields of view of the cameras as shown FIG. 1C, which have sight lines that are substantially parallel to each other. As illustrated in FIG. 1D, however, when the user places eyewear 12 on their head, frame 13 may flex due to temples 14A, 14B bowing outward to bowed temple positions 14A', 14B', resulting in a change in the orientation of the cameras 10, 11. When the orientation of the cameras 10, 11 change, the original sight lines 30, 31 of cameras 10, 11 shift by a respective variable angle 23A, 23B to flexed sight lines 30', 31' for new camera orientation 10', 11'. Thus, the sight lines 30' 31' of cameras 10 and 11 would no longer be parallel to each other.

The variable angles 23A, 23B resulting from this flexing are dependent on the stiffness of the temples 14A, 14B, the stiffness of the frame 13, the size of the user's head, etc. Thus, the relative fields of view of cameras 10 and 11 may be different for different wearers. The unflexed field of view of camera 10 changes by angle 23A from a field of view represented by lines 25A to 25B to a field of view represented by 25A' to 25B'. The unflexed field of view of camera 11 changes by angle 23B from a field of view represented by lines 25C to 25D to a field of view represented by 25C' to 25D'. In an example, a stereoscopic image algorithm calibrates the cameras to determine their relative fields of view.

Only two flexure states are illustrated in FIG. 1D, however, flexure may occur along and/or around essentially any axis extending through the eyewear 12. The range of flexure may have a minimum and a maximum that is dependent on the structural stiffness of frames 13. In general, as the frame stiffness increases and/or the temple stiffness decreases, the range of flexure decreases. Therefore, the eyewear may be designed and manufactured with a predetermined stiffness that limits the flexure range to an acceptable level along all axis and angles of flexure. The stiffness may be designed based on the materials used to construct the frame. For example, a crossbar (e.g., metal) may be integrated in the frames along line 21 to limit the flexure of the frames and thus limit the movement of the sight lines/fields of view of cameras 10, 11 to a predetermined range acceptable for producing the stereoscopic image.

Generally, the eyewear 12 performs a calibration prior to generating stereoscopic images. The calibration algorithm includes capturing images from both cameras 10 and 11 and determining the relative fields of view between the cameras by matching features between corresponding images captured by each of the cameras (i.e., what is the relative movement of a feature between right camera 10 and left camera 11. This calibration may be performed automatically by the eyewear, or upon user request (e.g., the user pressing a button such as button 32 (FIG. 1B)). Once calibration is performed, the eyewear may capture stereoscopic images for use in producing three dimensional images and/or producing three dimensional effects by taking into account changes to the sight lines/fields of view.

Figure 2:
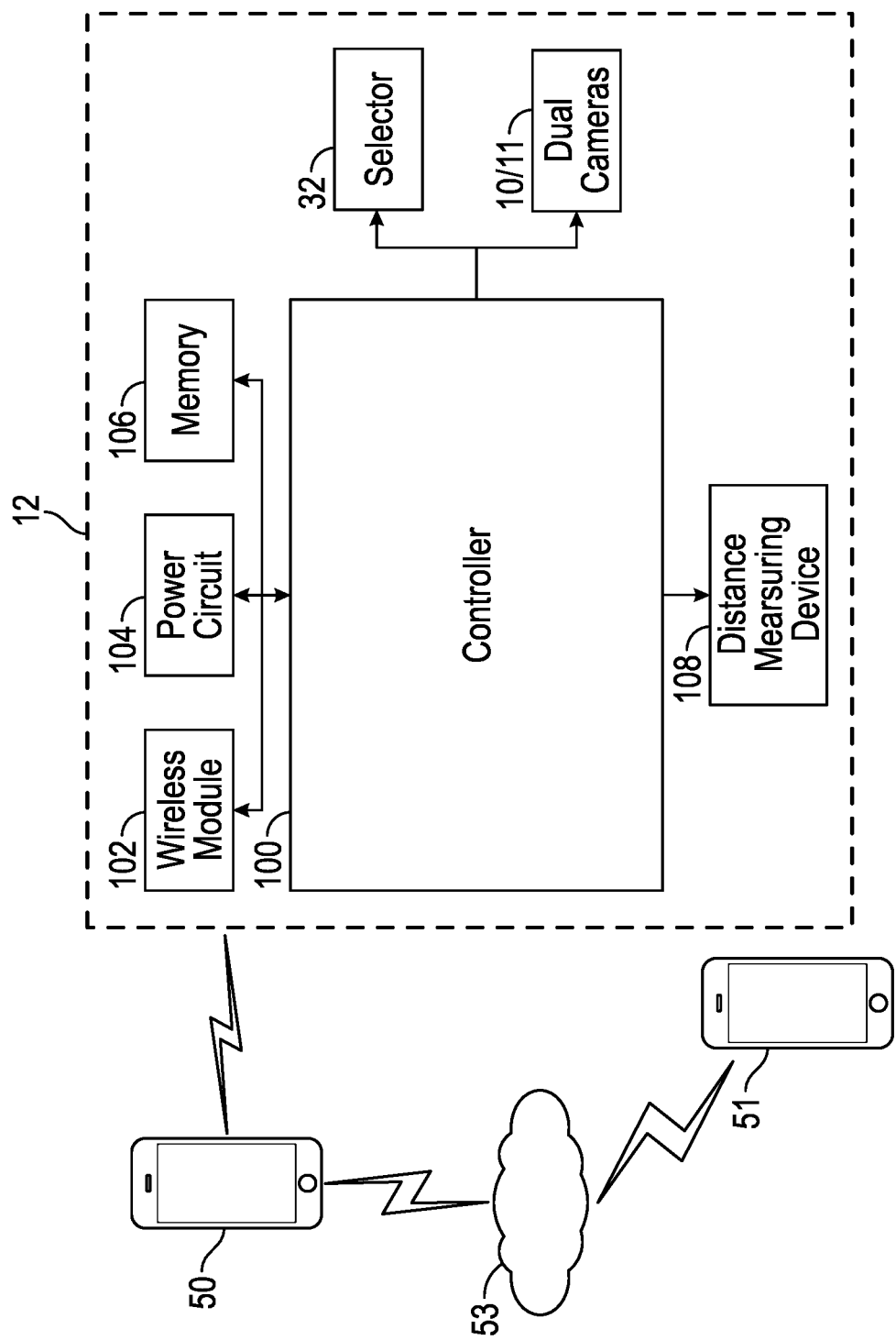
FIG. 2 is a block diagram of an example of the electronic components supported by the image capture eyewear example of FIG. 1A, and communication with a personal computing device and a recipient through a network.

FIG. 2 is a block diagram of example electronic components of eyewear capable of performing calibration and rendering/displaying three dimensional images taking into account changes in sight lines/fields of view as described above. The illustrated electronic components include a controller 100 (e.g., lower power processor, image processor, etc.) for controlling the various devices in the image capture eyewear 12; a wireless module (e.g., Bluetooth™) 102 for facilitating communication between the image capture eyewear 12 and a client device (e.g., a personal computing device 50); a power circuit 104 (e.g., battery, filter, etc.) for powering image capture eyewear 12; a flash storage 106 for storing data (e.g., images, video, image processing algorithms/software, etc.); a distance measuring device 108 such as a laser measuring device; a selector 32; and dual cameras 10, 11 for capturing the images and/or a series of images (e.g., video), and a microphone (not shown) for capturing sound. Although the image capture eyewear 12 and the personal computing device 50 are illustrated as separate components, the functionality of the personal computing device 50 may be incorporated into the image capture eyewear 12 enabling the image capture eyewear 12 to directly send a stereoscopic image(s) to one or more recipients (e.g., recipients 51 via Internet 53) without the need for a separate computing device. Additionally, processing described herein as performed by eyewear 12 (e.g., one or more steps of the calibration and stereoscopic algorithms) may be performed by a remote processor coupled to the eyewear device 12 such as a processor within the personal computing device 50.

The selector 32 may trigger (e.g., responsive to a momentary push of a button) controller 100 of image capture eyewear 12 to capture images/video for a calibration algorithm and/or stereoscopic imaging algorithm. In an example, the selector 32 may be a physical button on the eyewear 12 that, when pressed, sends a user input signal to the controller 100. The controller 100 may interpret pressing the button for a predetermined period of time (e.g., three seconds) as a request to perform the calibration algorithm and/or the stereoscopic imaging algorithm. In other examples, the selector 32 may be a virtual button on the eyewear or another device. In yet another example, the selector may be a voice module that interprets voice commands or an eye detection module that detects where the focus of an eye is directed. Controller 100 may also interpret signals from selector 32 as a trigger to select an intended recipient of the image(s) (e.g., user paired smartphone 50, or remote smartphone 51 via network 53).

Wireless module 102 may couple with a client/personal computing device 50 such as a smartphone, tablet, phablet, laptop computer, desktop computer, networked appliance, access point device, or any other such device capable of connecting with wireless module 102. Bluetooth, Bluetooth LE, Wi-Fi, Wi-Fi direct, a cellular modem, and a near field communication system, as well as multiple instances of any of these systems, for example, may implement these connections to enable communication there between. For example, communication between the devices may facilitate transfer of software updates, images, videos, lighting schemes, and/or sound between image capture eyewear 12 and the client device.

In addition, personal computing device 50 may be in communication with one or more recipients (e.g., recipient personal computing device 51) via a network 53. The network 53 may be a cellular network, Wi-Fi, the Internet or the like that allows personal computing devices to transmit and receive an image(s), e.g., via text, email, instant messaging, etc.

Cameras 10, 11 for capturing the images/video may include digital camera elements such as a charge-coupled device, a lens, or any other light capturing elements for capturing image data for conversion into an electrical signal(s). Cameras 10, 11 may additionally or alternatively include a microphone having a transducer for converting sound into an electrical signal(s).

The controller 100 controls the electronic components. For example, controller 100 includes circuitry to receive signals from cameras 10, 11 and process those signals into a format suitable for storage in memory 106 (e.g., flash storage). Controller 100 powers on and boots to operate in a normal operational mode, or to enter a sleep mode. In one example, controller 100 includes a microprocessor integrated circuit (IC) customized for processing sensor data from camera 10, along with volatile memory used by the microprocessor to operate. The memory may store software code for execution by controller 100 (e.g., execution of the calibration algorithm, the stereoscopic imaging algorithm, recipient selection, transmission of images, etc.).

Each of the electronic components require power to operate. Power circuit 104 may include a battery, power converter, and distribution circuitry (not shown). The battery may be a rechargeable battery such as lithium-ion or the like. Power converter and distribution circuitry may include electrical components for filtering and/or converting voltages for powering the various electronic components.

Calibration Algorithm

Figure 3A:
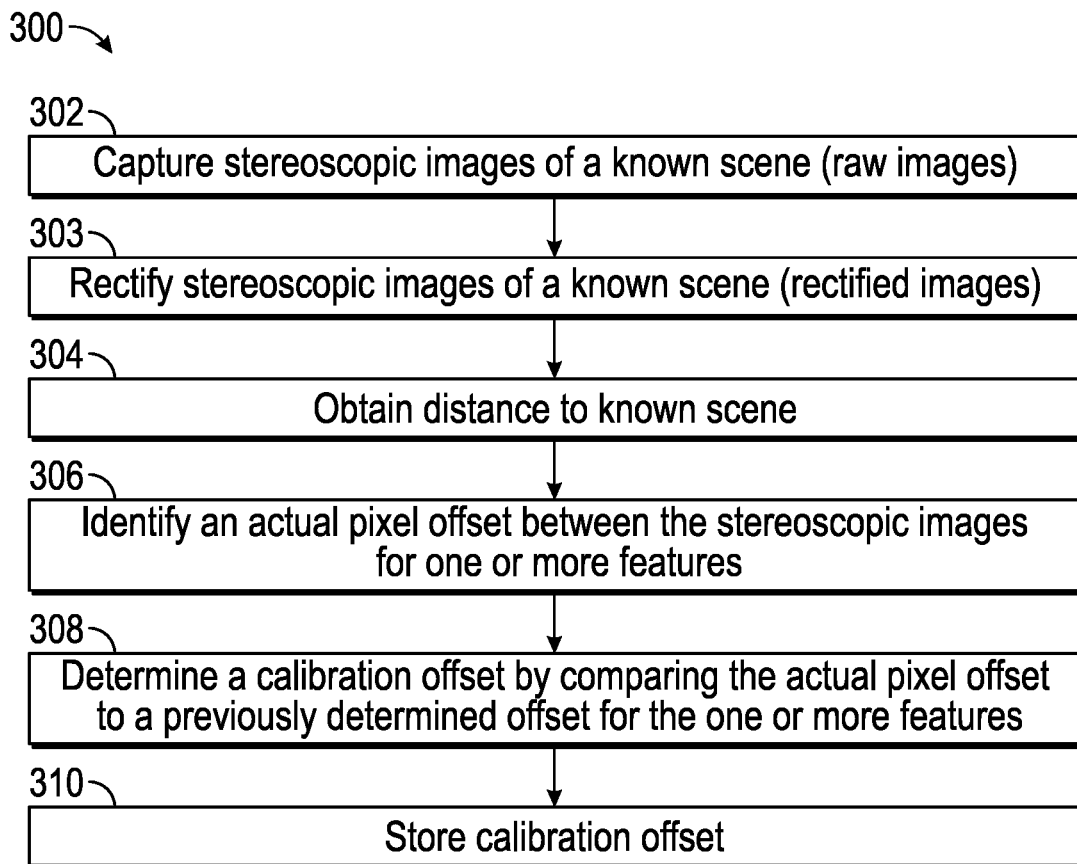
FIG. 3A is a flowchart showing an example of the operation of the dual camera eyewear for performing calibration of the dual cameras.

FIG. 3A depicts a calibration process 300. As described above, prior to performing stereoscopic imaging, the eyewear performs a calibration process to determine the relative difference between current lines of sight/fields of views of the stereoscopic cameras (e.g., cameras 10, 11) to standard sight lines/fields of view for eyewear not experiencing any flexure. This is beneficial to ensuring that the stereoscopic imaging algorithm is able to correctly combine the images to produce a quality stereoscopic image.

At block 302, the eyewear captures stereoscopic images of a scene containing at least one object with known dimensions (referred to herein as a known scene). Eyewear 12 may capture a right raw image of the known scene with right camera 10 and a left raw image of the known scene with left camera 11. In an example, the known scene has sharp features that are easily detectable by an image processing algorithm such as Scale Invariant Feature Transforms (SIFT) or Binary Robust Invariant Scalable Keypoints (BRISK). In another example, a trained deep neural network (DNN) can identify known objects such as people or cars.

At block 303, the images obtained at block 303 are rectified to remove distortion. Controller 100 may rectify the images to remove distortion introduced by the respective lenses of the cameras (e.g., distortion at the edges of the lens resulting from vignetting) to facilitate comparison of features between images. The right raw image is rectified to create a right rectified image and the left raw image is rectified to create the right rectified image.

At block 304, the calibration algorithm obtains a distance to a known feature in the known scene. In one example, the calibration algorithm run by controller 100 determines the distance to the known feature based on the size of the known feature in the captured image(s), e.g., the number of pixels covered by the known feature in a horizontal and/or vertical direction. In another example, the height/width of detected known objects are determined from bounding rectangles detected by a DNN. A DNN may also be trained to directly estimate a distance to a known object. In another example, the calibration algorithm receives the distance from a distance measuring device 108 such as a laser measuring device incorporated into the eyewear.

At block 306, the calibration algorithm identifies an actual offset between the stereoscopic images for one or more features in the known scene. The calibration algorithm may compare an offset for a known feature(s) in one image (e.g., a left raw or rectified image to that know feature(s) in another image (e.g., a right raw or rectified image). In an example, the number of pixels between the position of the feature in the left image and the position of the feature in the right image (e.g., in a horizontal direction) is the actual offset.

At block 308, the calibration algorithm determines a calibration offset. In an example, the calibration offset is a difference between the actual offset and a previously determined offset for the one or more features in the known scene determined with eyewear not experiencing any flexure.

In an alternative embodiment, the calibration offset is determined based on an amount of flexure experienced by the eyewear. The amount of flexure may be estimated based on a value generated by a strain gauge in the frame of the eyewear. For example, predefined offset values may be associated with predefined levels of strain (e.g., none, low, medium, and high). A difference calibration offset may be determined for each flexure amount (e.g., using steps 302–308) enabling the system to properly render and display stereoscopic images taking into account the amount of flexure.

At block 310, store the calibration offset(s). In an example, the calibration algorithm stores the calibration offset(s) in memory 106 accessible by controller 100, e.g., for use in generating stereoscopic images. The controller 100 may store each calibration offset along with a flexure amount corresponding to the offset.

Stereoscopic Algorithm

Figure 3B:
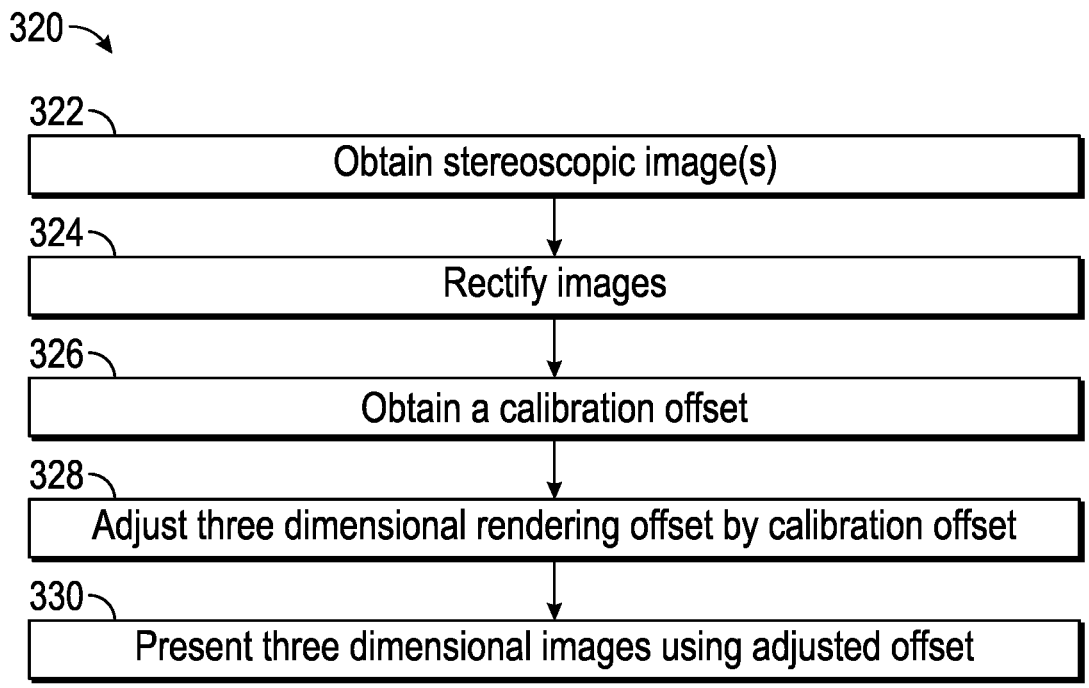
FIG. 3B is a flowchart showing further details of the example of the operation of the dual camera eyewear for performing stereoscopic imaging using the calibration results.

FIG. 3B depicts a three-dimensional presentation process 320. As described above, after the calibration is complete, the eyewear may perform stereoscopic imaging to render/display three dimensional images.

At block 322, the eyewear obtains stereoscopic images of a scene. Eyewear 12 may capture a right raw image of the known scene with right camera 10 and a left raw image of the known scene with left camera 11.

At block 324, the stereoscopic algorithm rectifies the obtained raw stereoscopic images to correct distortion in the stereoscopic images. Controller 100 may rectify the images to remove distortion introduced by the respective lenses of the cameras (e.g., distortion at the edges of the lens resulting from vignetting) to facilitate comparison of features between images. The right raw image is rectified to create a right rectified image and the left raw image is rectified to create the right rectified image.

At block 326, the stereoscopic algorithm obtains a calibration offset (e.g., from the process described above with respect to FIG. 3A). In an example, controller 100 retrieves the calibration offset from memory 106. Controller 100 may first determine an amount of flexure the frame 12 is experiencing and select a calibration offset from memory 106 corresponding to the amount of flexure.

At block 328, the stereoscopic algorithm adjusts a three-dimensional rendering offset (i.e., an offset between two captured images of a scene captured by cameras having a known relationship to one another in order to provide a three-dimensional effect) in a rendering algorithm by the obtained calibration offset. In an example, controller 100 adjusts the three-dimensional rendering offset by the calibration offset.

At block 330, the stereoscopic algorithm presents three dimensional images based on the rendered stereoscopic images using the adjusted offset. In an example, the stereoscopic algorithm presents the right and left images of the stereoscopic images to the right and left eyes, respectively, of an observer (e.g., via displays of the eyewear). The presented images are projected, taking the adjusted offset into account, in order provide a more realistic three-dimensional effect to the wearer. In another example, the stereoscopic algorithm blends the right and left images of the stereoscopic images on a display, taking the adjusted offset into account, in order provide a more realistic three-dimensional effect to the viewer.

The steps in FIGS. 3A and 3B may be performed by controller 100 of the electronic components and/or the personal computing device upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 100 or personal computing device 50 described herein, such as the steps in FIGS. 3A and 3B, may be implemented in software code or instructions that are tangibly stored on a tangible computer readable medium. Upon loading and executing such software code or instructions by the controller and/or personal computing device, the controller and/or personal computing device may perform any of the functionality of the controller and/or personal computing device described herein, including the steps in 3A and 3B described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Image capture eyewear, including:
   a support structure;
   dual cameras connected to the support structure to capture stereoscopic images of a scene;
   a processor;
   a memory accessible to the processor; and
   programming in the memory, wherein execution of the programming by the processor configures the image capture eyewear to perform functions, including functions to:
   determine an amount of flexure of the support structure;
   select a calibration offset from a plurality of predetermined calibration offsets responsive to the determined amount of flexure to accommodate flexure in the support structure;
   adjust a three-dimensional rendering offset between two captured stereoscopic images of the scene from the dual cameras using the selected calibration offset; and
   present the adjusted two captured stereoscopic images of the scene from the dual cameras as a three-dimensional image using the adjusted three-dimensional rendering offset.

2. The eyewear of claim 1, wherein the dual cameras are positioned on the support structure of the eyewear a predetermined distance apart to capture stereoscopic images from different fields of view.

3. The eyewear of claim 1, wherein the support structure includes a frame and temples extending from the frame, the dual cameras are supported by the frame, and the frame includes a rigid bar embedded therein for increasing the stiffness of the frame.

4. The eyewear of claim 1, wherein the programming in the memory further obtains the calibration offset by calculating the calibration offset as a difference between an actual offset and a previously determined offset for one or more features in a known scene determined with eyewear not experiencing any flexure, where the actual offset is a number of pixels between the stereoscopic images for the one or more features in the known scene in respective stereoscopic images captured by the dual cameras.

5. The eyewear of claim 1, wherein the programming in the memory further estimates the calibration offset based on a value generated by a strain gauge in the support structure.

6. The eyewear of claim 1, wherein the programming in the memory for obtaining the calibration offset determines a distance to a known object in the image.

7. The eyewear of claim 1, wherein the programming in the memory for presenting images includes blending the stereoscopic images using the adjusted offset.

8. The eyewear of claim 1, wherein the functions to select a calibration offset includes a function to:
   select the calibration offset from the plurality of predetermined calibration offsets responsive to the determined amount of flexure to accommodate flexure in the support structure, the plurality of predetermined calibration offsets determined by capturing stereoscopic images of a known scene, obtaining a distance to the known scene, identifying an actual pixel offset between the stereoscopic images for one or more image features, determining the predetermined calibration offsets by comparing the actual pixel offsets to a previously determined offset for the one or more features, and storing the predetermined calibration offsets.

9. A calibration method for image capture eyewear, the method comprising the steps of:
calculating a plurality of predetermined calibration offsets;
obtaining stereoscopic images from dual cameras supported by a support structure of an image capture eyewear device;
determining an amount of flexure of the support structure;
selecting a calibration offset from the plurality of predetermined calibration offsets responsive to the determined amount of flexure to accommodate flexure in the support structure between the dual cameras;
adjusting a three-dimensional rendering offset between two obtained stereoscopic images from the dual cameras using the selected calibration offset;
rendering the two obtained stereoscopic images from the dual cameras as a three-dimensional image using the adjusted three-dimensional rendering offset, wherein the adjusted three-dimensional rendering offset is adjusted by the selected calibration offset; and
presenting the three-dimensional image on a display.

10. The method of claim 9, wherein calculating the plurality of predetermined calibration offsets comprises calculating each calibration offset as a difference between an actual offset and a previously determined offset for one or more features in a known scene determined with eyewear not experiencing any flexure, where the actual offset is a number of pixels between the stereoscopic images for the one or more features in the known scene in respective stereoscopic images captured by the dual cameras.

11. The method of claim 9, wherein calculating the plurality of predetermined calibration offsets comprises estimating each calibration offset based on a value generated by a strain gauge in the support structure.

12. A non-transitory computer readable medium comprising instructions which, when executed by one or more processors, cause the one or more processors to perform operations comprising:
obtaining stereoscopic images from dual cameras supported by a support structure of an image capture eyewear device;
determining an amount of flexure of the support structure;
selecting a calibration offset from a plurality of predetermined calibration offsets responsive to the determined amount of flexure to accommodate flexure in the support structure between the dual cameras;
adjusting a three-dimensional rendering offset between two obtained stereoscopic images from the dual cameras using the selected calibration offset;
rendering the two obtained stereoscopic images from the dual cameras as a three-dimensional image using the adjusted three-dimensional rendering offset, wherein the adjusted three-dimensional rendering offset is adjusted by the selected calibration offset; and
presenting the three-dimensional image on a display.

13. The medium of claim 12, further comprising instructions which, when executed by one or more processors, cause the one or more processors to perform additional operations comprising:
blending the stereoscopic images using the adjusted offset to create the three-dimensional image for presentation on the display.

14. The medium of claim 12, wherein the image capture eyewear device includes a first display and a second display, the medium further including instructions which, when executed by one or more processors, cause the one or more processors to perform additional operations comprising:
presenting a left image component of the three-dimensional image on the first display and a right image component of the three-dimensional image on the second display.

15. The medium of claim 12, further comprising instructions which, when executed by one or more processors, cause the one or more processors to perform additional operations comprising:
obtaining the calibration offset by calculating the calibration offset as a difference between an actual offset and a previously determined offset for one or more features in a known scene determined with eyewear not experiencing any flexure, where the actual offset is a number of pixels between the stereoscopic images for the one or more features in the known scene in respective stereoscopic images captured by the dual cameras.

16. The medium of claim 12, further comprising instructions which, when executed by one or more processors, cause the one or more processors to perform additional operations comprising:
estimating the calibration offset based on a value generated by a strain gauge in the support structure.

17. The medium of claim 12, further comprising instructions which, when executed by one or more processors, cause the one or more processors to perform additional operations comprising:
storing a plurality of calibration offsets in a memory, each calibration offset corresponding to an amount of flexure of the image capture eyewear.

18. The medium of claim 17, further comprising instructions which, when executed by one or more processors, cause the one or more processors to perform the selecting step by performing operations comprising:
retrieving from the memory the calibration offset corresponding to the determined amount of flexure from the plurality of calibration offsets.

19. The medium of claim 12, further comprising instructions which, when executed by one or more processors, cause the one or more processors to perform the selecting step by performing operations comprising:
determining the amount of flexure of the support structure by determining an amount of strain in the support structure.

20. The medium of claim 12, further comprising instructions which, when executed by one or more processors, cause the one or more processors to select the calibration offset by performing operations comprising:
selecting the calibration offset from the plurality of predetermined calibration offsets responsive to the determined amount of flexure to accommodate flexure in the support structure between the dual cameras, the plurality of predetermined calibration offsets determined by capturing stereoscopic images of a known scene, obtaining a distance to the known scene, identifying an actual pixel offset between the stereoscopic images for one or more image features, determining the predetermined calibration offsets by comparing the actual pixel offsets to a previously determined offset for the one or more features, and storing the predetermined calibration offsets.

* * * * *